Feb. 8, 1944.  O. GRUENEWALD  2,341,142
MILKING MACHINE
Filed Dec. 14, 1942   3 Sheets-Sheet 1
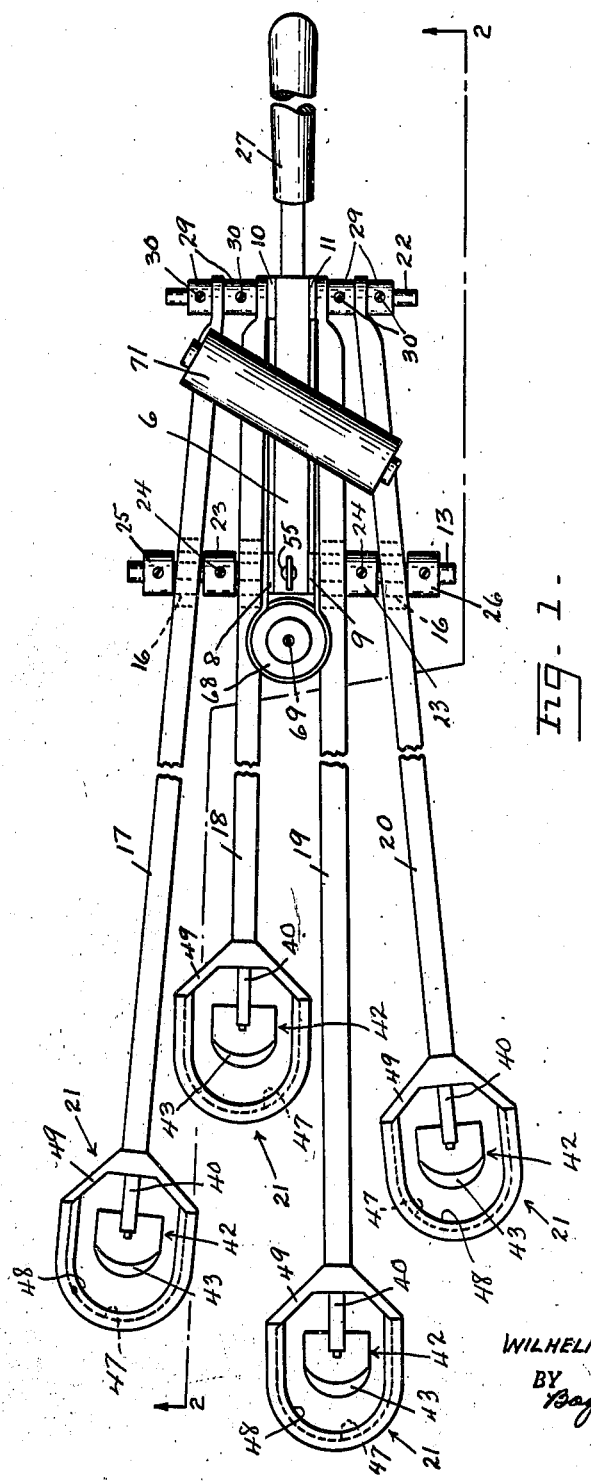
INVENTOR.
WILHELM O. GRUENEWALD
BY
ATTORNEYS.

Feb. 8, 1944.                W. O. GRUENEWALD                2,341,142
                              MILKING MACHINE
                          Filed Dec. 14, 1942         3 Sheets-Sheet 2
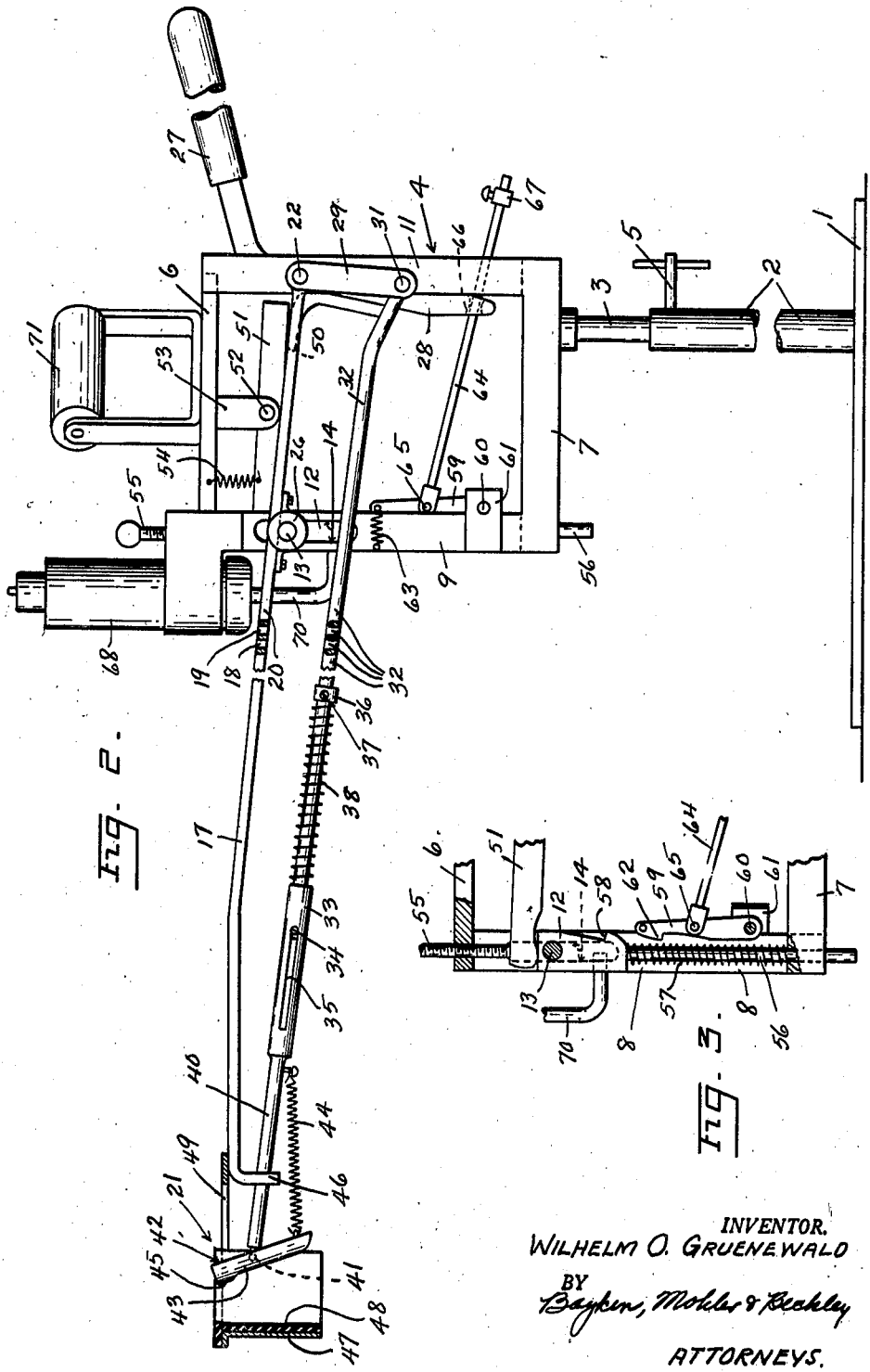
INVENTOR.
WILHELM O. GRUENEWALD
BY
ATTORNEYS.

Feb. 8, 1944.  W. O. GRUENEWALD  2,341,142
MILKING MACHINE
Filed Dec. 14, 1942  3 Sheets-Sheet 3

INVENTOR.
WILHELM O. GRUENEWALD
BY
Boyken, Mohler & Beckley
ATTORNEYS.

Patented Feb. 8, 1944

2,341,142

UNITED STATES PATENT OFFICE 2,341,142

MILKING MACHINE

Wilhelm O. Gruenewald, San Francisco, Calif.

Application December 14, 1942, Serial No. 468,899

9 Claims. (Cl. 31—79)

This invention relates to mechanical milking machines as distinguished from the suction milkers.

One of the objects is the provision of simple, easily operated milking machine that is more efficient than previous milking machines of generally the same class, and which machine performs a milking operation in substantially the same manner as that performed by an experienced and efficient hand milker using the "Swiss system," but more rapidly than the hand milker.

Another object of the invention is the provision of a milking machine that is not detrimental to milch cows, and which machine includes teat grasping elements that are adjustable as to both the degree of compression of the teats thereby and the milking stroke so as to be readily adapted to any circumstances.

Other objects and advantages will appear in the description and drawings annexed hereto.

Briefly described, the machine of this invention performs the operation of milking a cow through the employment of elements that respectively compress each teat closely adjacent the udder and then the compression of each teat progressively continues downwardly along the teat without a break or gap in the compressive force between the initial point of compression and the lower end of the teat. Simultaneously with said progressive application of pressure along the teat, the latter is drawn downwardly and at the bottom of the downward stroke or pull, all of the compressive force on each teat is instantly released so that each teat may almost instantly resume its normal fully expanded shape in its normal position for repetition of the milking operation.

I am aware of the fact that machines have been made that attempt to perform the milking operation by initially compressing each teat close to the udder and then applying a compressive force lower down on the teat, but in most instances milk is trapped in the teat between the point of initial compression and subsequently applied compressive force therebelow, or else there has been no downward pull on the teat during the application of the pressure. These devices have not proven to be satisfactory and sometimes result in injury to tissue in the milk duct. Also rollers that compress the teat therebetween and are downwardly moved to progressively squeeze the milk from the teat are not satisfactory and are painful to the cow. The milk will not readily flow into each teat as such rollers move therealong, either because the cow voluntarily or involuntarily withholds the milk, or because the milking action is incorrect.

With the milking machine of this invention the milking operation is performed with the maximum efficiency that is obtainable by a skillful hand milker insofar as the volume of milk obtained is concerned, and the speed of milking is much faster. Also there is absolutely no injury to a cow by use of this machine and the machine is quickly adjustable to meet any variations in the physical conformation of the teats of various cows as well as being adjustable to produce the best results in those instances where certain cows are hard milkers while others are easy milkers and differences in milking technique must be applied to different cows irrespective of any physical differences.

In the drawings,

Fig. 1 is a plan view of a machine illustrating the invention.

Fig. 2 is a vertical sectional view taken along line 2—2 of Fig. 1. In this view the parts are shown in the initial position preparatory to a milking operation.

Fig. 3 is a fragmentary vertical sectional view of part of the machine.

Figures 4, 5:
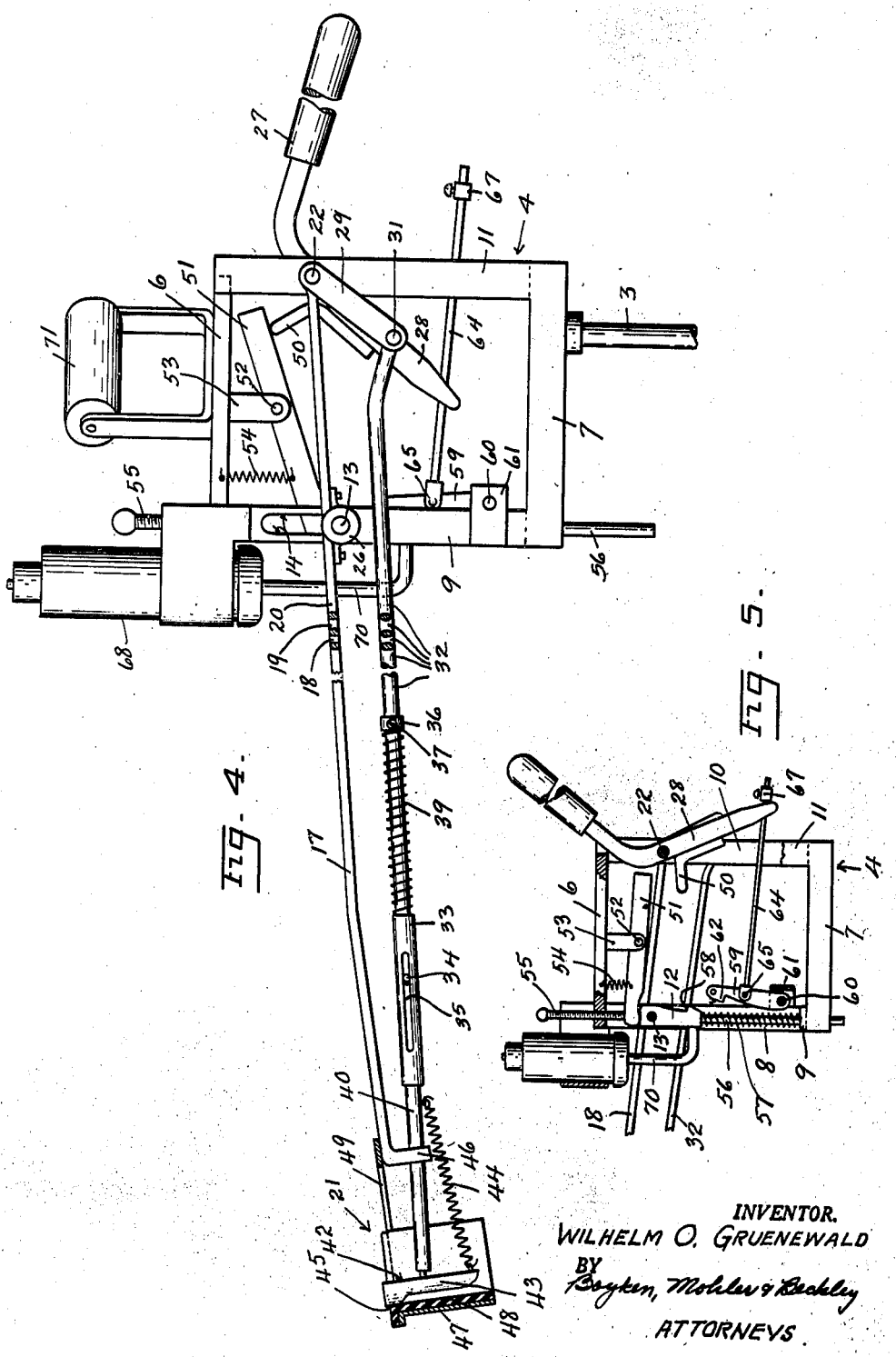
Fig. 4 is a vertical sectional view of the machine corresponding to Fig. 2 except that the elements are shown at the completion of a down stroke, whereas in Fig. 2 the parts are shown in the initial position preparatory to milking operation.
Fig. 5 is a reduced size vertical sectional view of a portion of the machine showing the operating handle in a position immediately after a down stroke and preparatory to making another stroke.

In detail, the machine illustrated in the drawings comprises a base 1 (Fig. 2) adapted to rest on the ground or on a floor, and which base has a vertical hollow post 2 secured at its lower end to said base. Telescopically slidable in post 2 is a second post 3 that carries a frame generally designated 4 at its upper end, and which second post and frame are held in any desired degree of elevation relative to the base by means of a set screw 5 that threadedly extends through post 1 in releasable engagement with post 2.

The frame 4 may be substantially rectangular and disposed in a vertical plane, having an upper horizontal frame member 6 and a lower horizontal frame member 7. One of the vertical sides of the frame comprises spaced, parallel frame members 8, 9 (Fig. 5) while the other vertical side comprises spaced, parallel frame members 10, 11. The frame members 8, 9 thus form sides of a vertically extending slot, and members 10, 11 form the sides of a similar slot.

A block 12 (Figs. 3, 5) is slidable vertically between members 8, 9 and a horizontal shaft 13 extends through said block and through aligned vertical slots 14 (Figs. 2, 3) respectively formed in the vertical frame members 8, 9.

A plurality of generally horizontally extending arms 17, 18, 19, 20 (Fig. 1) extend across the ends of shaft 13 that project oppositely outwardly of the members 8, 9 that form one side of the frame 4, two of said arms 17, 18 being at one side of the frame and the other two arms 19, 20 being at the other side of the frame. Each of said arms is supported on shaft 13 by any suitable bearing 16 through which the shaft rotatably extends.

The arms 17 to 20 extend divergently relative to each other from said frame for a substantial distance, and at the divergent ends of said arms each of the latter carries a teat embracing device generally designated 21. The divergently projecting end portions of the arms 17 to 20 are so arranged that the four elements 21 will be positioned in vertical alignment with the teats of a cow when the frame is so supported on base 1 at one side of the cow that the arms 17 to 20 will extend past the forward side of the rear leg of said cow that is nearest the frame 4.

The convergent ends of arms 17 to 20 terminate adjacent the vertical frame members 10, 11 and are pivoted on the opposite end portions of a horizontal shaft 22 (Fig. 1), which shaft extends through the frame members 10, 11 and parallel with shaft 13.

Spacers 23 adjustably secured on shaft 13 by set screws 24 space arms 17, 18 from each other and also space arms 19, 20 from each other, while washers 25, 26 that are similar to spacers 23 are secured by set screws on shaft 13 outwardly of the outermost arms 17, 20 for holding the said arms against outward movement on shaft 13.

An operating handle 27 extending outwardly of the frame members 10, 11 and in substantially the same plane as frame 4, is tightly secured at one end on shaft 22. An extension 28 is integral with handle 27, projecting generally downwardly from the shaft 22 and at about right angles to handle 27 (Fig. 5). As shaft 22 is rotatably supported on frame members 10, 11, it will be seen that oscillation of handle 27 will cause rotation of shaft 22.

Four links 29 are adjustably secured on shaft 22 by set screws 30 (Fig. 1) and which links project downwardly from shaft 22 (Figs. 2, 4). These links are alongside the convergent ends of arms 17 to 20, and one pair of said links space the convergent ends of arms 17, 18 on one end of shaft 22, and the convergent ends of arms 19, 20 that are on the other end of said shaft, while the remaining pair of links 29 are respectively on shaft 22 outwardly of the outermost arms 17, 20.

Connected by pivot 31 to the lower end of each of the links 29 is one end of a rod 32 (Fig. 2). Each of the rods 32 is spaced below one of the arms 17 to 20 and generally parallel therewith. The opposite end of each rod 32 is telescopically slidable in a sleeve 33. Said opposite end of each of said rods carries a transverse pin 34, the ends of which project through parallel slots 35 in the opposite sides of sleeve 33.

Each rod 32 also carries a member 36 thereon, in the form of a thick washer, adjustably secured thereto by a set screw 37. The members 36 are spaced from sleeve 33 and a compression coil spring 39 on each rod is positioned between the sleeve and the member 36 so as to yieldably hold the pin 34 on each rod at the end of the slot 35 nearest frame 4. Thus each sleeve is yieldably held in outward extension of each rod 32.

Secured to the end of each sleeve 33 that is remote from the end of rod 32 is a rod 40, said latter rod being coaxial with rod 32 and sleeve 33. The outer end of each rod 40 is connected by a horizontal pivot 41 (Fig. 2) to one side of an element 42 of a teat engaging device 21.

Each element 42 is vertically elongated and is of convex contour on its side opposite rod 40 in horizontal cross-section (Fig 1), said latter side being covered with a layer 43 relatively soft resilient material, such as rubber. The horizontal width of each element 42 is about equal to the width of a teat or the width of the thumb of a man, although it may be slightly greater, and the length may be about the length of a cow's teat.

Each pivot 41 connects a rod 40 to an element 42 at a point slightly above a central point between the upper and lower ends of said element, and a relatively light coil spring 44 connects the lower end of each element and the adjacent rod 40 to yieldably hold the element at an angle relative to rod 40 as best indicated in Fig. 2. This inclination of element 47 is such that an acute angle is formed between rod 40 and the portion of each element below pivot 41, while the angle between the portion of each element above pivot 41 and said rod is obtuse.

The formation of the outer surface of each element 42, or the exposed surface of layer 43, is particularly important. The convex horizontal contour has been explained, but the vertical contour is one in which a horizontal ridge 45 is along the upper edge of the element (convex in horizontal contour) and the vertical contour of which ridge gradually tapers rearwardly (toward the element 42) and then the remainder of the outer surface of layer 43 below the ridge is substantially straight vertically or from the ridge 45 to the lower end of the element 42. This ridge and straight face, both of which are convex in horizontal contour, are integral with each element 42, in that they simultaneously pivot on pivot 41 as each element is pivoted.

Each of the arms 17 to 20 carries a bearing 46 disposed therebelow through which one of the rods 40 is reciprocable, and a generally U-shaped (in horizontal contour), vertically extending rigid member 47 having a soft lining 48 of resilient material, such as rubber, is secured to the outer end of each of said arms.

The member 47 on each arm is part of each teat engaging device 21, and is secured to each arm by a bracket 49 in a position with the concave side of each member 47 facing the convex side of each layer 43. In a vertical length, each element 42 including its layer 43 is about the same as the vertical length of each member 47, but the width of each member 47 between the opposite sides thereof, including the lining 48, is substantially greater than the width of each element 42.

The element 42 in each member 47 is reciprocable toward and away from the convex side of member 47 between the straight sides of the latter upon reciprocation of rod 40.

Secured on the downward extension 28 of the handle 27 is a projection 50 (Fig. 4) and which projection extends away from the extension 28 at generally about a right angle thereto in direction toward the vertical frame members 8, 9.

The projection 50 is in the form of a strip of metal that may be cast integrally with the extension 28 if desired. When the handle 27 is elevated to the position indicated in Fig. 2, the projection 50 is disposed below, and generally parallel with one end of an elongated rocking piece 51 that may be in the form of a square bar.

The piece 51 is pivoted at 52 on a hanger 53 at a point intermediate the ends of said piece. The hanger may be secured to the top member 6 of frame 4. The end of piece 51 that is opposite the end thereof that extends over projection 50 engages the upper end of the sliding block 12 that is disposed between the frame members 8, 9. A relatively light coil spring 54 connecting between piece 6 and the piece 51 at a point between pivot 52 and block 12 yieldably holds the end of piece 50 that is over block 12 in engagement with the lower end of an adjusting screw 55 that threadedly extends through one end of the upper frame member 6 into the slot between the side frame members 8, 9, as best seen in Fig. 5.

The block 12 is secured to the upper end of a vertical rod 56 that slidably extends through one end of the lower frame member 7 (Fig. 3), and a coil spring 57 around rod 56 is interposed between the lower end of block 12 and the lower frame member 7 to yieldably hold the block 12, and the shaft 13 including arms 17 to 20 in the elevated position of the latter as seen in Figs. 2, 5.

The side of block 12 that faces the extension 28 is formed with a notch 58 (Fig. 3) having an upwardly facing square shoulder.

A vertically extending latch 59 adjacent the lower ends of the frame members 8, 9 is pivoted at its lower end at 60 between the sides of a U-shaped bracket 61 that has its legs secured to side frame members 8, 9, respectively (Fig. 3). The pivot 60 supports latch 59 for horizontal swinging of the upper end of the latter, and the upper end of said latch is formed with a tooth 62 that is adapted to engage the notch 58 when the block 12 is moved downwardly to the point where the tooth can slip into said notch. A coil spring 63 (Fig. 2) yieldably holds the upper end of latch 59 in a position to cause tooth 62 to engage notch 63 when said block is so moved downwardly, as best seen in Fig. 3.

A rod 64 is pivotally connected at one end to latch 59 above pivot 60 by a horizontal pivot 65, and said rod extends from said latch through a cleft or opening 66 (Fig. 2) in the outer end of the extension 28 on handle 27. A stop 67 is adjustably secured on the outer end of rod 64, and the rod is reciprocable in opening 66.

On frame 4 and above arms 17 to 20 is secured a dash pot 68 having a restricted air release aperture 69 in its upper head. Said dash pot has a conventional piston therein, the rod 70 of which is secured to block 12.

A handle 71 may be secured to the upper frame member 6 in a position for grasping by one hand of an operator during the milking operation effected by oscillation of handle 27.

In operation, the milking machine is first placed in the desired position with the teat engaging devices 21 positioned so that the teats of the cow are relatively loosely surrounded by the members 47, in which case each element 42 is alongside each teat so embraced. This position is obtained by lifting the handle 27 to the topmost end of its stroke (Fig. 5), in which position the elements 42 will be retracted until they are close to the bearings 46 that are on the ends of arms 17 to 20.

It will be noted that in the above described position of handle 27, the projection 50 is spaced from the piece 51, hence the handle may be moved downwardly, and element 42 in each teat engaging device may move to the position of the element as seen in Fig. 2, without resistance whatsoever other than is caused by the teats.

Upon movement of handle 27 from the position indicated in Fig. 5 to the position indicated in Fig. 2, the ridge 45 of each layer 43 will initially engage each teat at a point close to the udder and as the teat is compressed, the layer 43 will gradually move toward parallelism with the teat as each spring 44 expands under tension.

When the handle reaches the position indicated in Fig. 2 and projection 50 engages the end portion of piece 51 that is above it, the teat compressing element 42 will be partially straightened until its layer 43 is almost parallel with the concave side of the liner 48 of member 47, thus extending the compressive force of element 42 downwardly along the teat.

Upon further downward movement of handle 27 the piece 51 will be pivoted by its engagement with projection 50, and the block 12 will be forced downwardly carrying the arms 17 to 18 and the teat compressing devices with them, further moving the layer 43 of each element 42 toward parallelism with the concave side of liner 48 in each member 47 and further compressing the teats.

When the handle 27 is at the lowermost end of its stroke the notch 58 in block 12 is engaged by the tooth of latch 59 and is held down until the handle 27 is moved upwardly sufficiently to effect withdrawal of latch 59 through engagement of the stop 67 on rod 64 by the lower end of the extension 28 of the handle 27. This disengagement between the latch and block occurs when the handle 27 is in about the position indicated in Fig. 5. As soon as the upward movement of handle 27 from its position in Fig. 4 occurs, the elements 42 are withdrawn from compressive relation to the teats, but the arms 17 to 20 still remain in lowered position, including elements 42, until latch 59 is disengaged from block 12.

As soon as latch 59 is disengaged from latch 12 the arms 17 to 20 quickly move upwardly carrying the teat compressing devices to the udder, and the operation of compressing and drawing the teats downwardly is repeated.

The dash pot 68 functions to cushion the return upward stroke of the arms and the teat compressing devices, although the return stroke is sufficiently fast to not require any delay in the oscillation of handle 27 by the milker.

The spring 54 merely prevents excessive and undesirable noise that would result were the piece 51 free to be restored to its position indicated in Fig. 5 by the upward movement of block 12 under the influence of spring 57.

In the milking operation, the pressure applied to the teats of a cow may be varied by adjusting the position of the spring-stops 36 on rods 32. The closer this stop is positioned to sleeve 33 on each rod, the greater will be the pressure on each teat. It is to be understood that the full line positions of the elements 42 as shown in the drawings are the positions where none of the devices 21 have a teat therein.

The downward stroke of the teat compressing devices is controlled by the screw 55. Downward turning of this screw shortens the stroke, while an upward retraction of the screw lengthens the stroke.

The reciprocable stroke of each of the elements 42 may be varied by adjustment of each link 29 on shaft 22 when the set screws 30 are loosened.

It is to be understood that the machine illustrated may be modified in various ways without altering the invention. For example, the milking machine could readily be operated by conventional motor power as distinguished from manual actuation, and various parts could be streamlined. A housing for enclosing the operating elements in frame 4 might be added without constituting invention. One of the most important features is that the teat compressing devices should be of generally the form as illustrated and should operate in the manner described. Of almost equal importance is the provision of a simple means for adjusting the oscillatory stroke of the teat compressing devices, preferably while the machine is in operation, and means for varying the compression force of the teat compressing elements.

Having described my invention, I claim:

1. A milking machine comprising a plurality of teat compressing devices each including a member and an element adjacent thereto and spaced therefrom for receiving a teat in the space therebetween; arms supporting said devices for generally vertical oscillatory movement thereof between predetermined limits and for movement of the said elements toward and away from said members and said elements being so movable; actuating means connected with said arms and with said elements for moving said arms downwardly and at the same time for moving said elements toward said members; means separate from said actuating means for moving said arms and the said devices upwardly after the said arms and said devices have reached the bottom limits of their respective strokes; and means for holding said arms and said devices at said bottom limits during movement of said elements in direction away from said members.

2. A milking machine comprising a plurality of teat compressing devices each including a member and an element adjacent thereto and spaced therefrom to receive a teat in the space therebetween; arms supporting said devices for generally vertical oscillatory movement thereof between predetermined limits and for movement of the said elements toward and away from said members; actuating means connected with said arms and with said elements for moving said arms downwardly and at the same time for moving said elements toward said members; means for releasably holding said arms and the said devices thereon at the lower limits of their respective strokes; and means for releasing said arms and for moving them and the devices thereon upwardly upon predetermined movement of said elements away from said members.

3. A milking machine comprising a plurality of teat compressing devices each including a member and an element adjacent thereto and spaced therefrom to receive a teat in the space therebetween; arms supporting said devices for generally vertical oscillatory movement thereof and for movement of the said elements toward and away from said members; means for moving said elements toward and away from said members independently of oscillatory movement of said devices when said devices are at the upper and lower ends of their strokes, respectively; and means for simultaneously effecting downward movement of said devices and movement of said elements toward said members.

4. A milking machine comprising a plurality of teat compressing devices each including a member and an element adjacent thereto and spaced therefrom to receive a teat in the space therebetween; generally horizontal arms carrying said devices at one of their ends; means pivotally supporting said arms for generally vertical oscillatory swinging of the devices together with the ends of the arms carrying the same between predetermined limits; actuating means connected with said elements for causing reciprocating movement of the latter toward and away from said members at opposite ends of the strokes of said arms independently of oscillating movement of said devices and the ends of the arms carrying said devices; and means for causing said oscillating movement of said devices and the said ends of the arms that carry them.

5. A milking machine comprising a plurality of teat compressing devices each including a member and an element adjacent thereto and spaced therefrom to receive a teat in the space therebetween; generally horizontal arms carrying said devices at one of their ends; pivots supporting the opposite ends of said arms for generally vertical oscillating movement of said devices upon oscillatory swinging of said arms; a single generally vertically reciprocable handle connected with said arms for causing downward movement of said arms, and a spring connected with said arms for causing upward movement of the latter; rods connecting said handle and said elements for causing movement of the said elements toward and away from said members upon downward and upward movement respectively of said handle.

6. A milking machine comprising a plurality of teat compressing devices each including a member and an element adjacent thereto and spaced therefrom to receive a teat in the space therebetween; generally horizontal arms carrying said devices at one of their ends for movement therewith; pivots supporting said arms for generally vertical oscillatory movement of said arms and said devices upon vertical swinging of said arms on said pivots; means reciprocably supporting said elements for movement toward and away from said members during said movement of said devices; reciprocably movable actuating means connected with said arms and with said elements arranged and adapted to simultaneously swing said arms downwardly and to move said elements toward said members upon movement of said actuating means in one direction to the lower end of the stroke of said arms; latch means automatically and releasably connecting with said arms at said lower end of their stroke for holding said arms at said lower end; means actuated by upward movement of said actuating means adjacent the upper end of the stroke of said actuating means for releasing said latch means from connection with said arms; and a spring actuatable upon said release of said latch means for moving said arms upwardly to the upper end of their stroke.

7. A construction as defined in claim 6; and means for varying the limits of the stroke of said arms during reciprocable movement of the latter.

8. In a milking machine, the combination comprising a plurality of teat compressing devices each comprising a pair of members movable toward and away from each other; a frame; arms projecting laterally from a side of said frame each carrying one of said devices at the outer end thereof; pivots supporting said arms on said frame for vertical oscillation thereof, together with said devices, between predetermined limits; spring means yieldably holding said arms at the upper of said limits; movable actuating means for moving said arms downwardly to the lower limit of their movement and against the tension of said spring means; means for releasably holding said arms at said lower limit of their movement; and means actuated by said actuating means releasing said arms at the said lower limit of their movement for return upward movement of said arms solely under the influence of said spring means.

9. The combination as defined in claim 8, plus means connecting between said members and said actuating means for movement of said members toward and away from each other independently of said oscillatory movement of said arms when said arms are held at the upper and lower limits of their movement, respectively.

WILHELM O. GRUENEWALD.